Dec. 27, 1966  J. W. WAY  3,294,617
REINFORCED SEAMS FOR SUITS MADE OF EXPANDED
ELASTOMERS, SUCH AS DIVING SUITS
Filed Dec. 3, 1963

INVENTOR.
JACK W. WAY
BY Nicholas T. Vohr
ATTORNEY.

United States Patent Office 3,294,617
Patented Dec. 27, 1966

3,294,617
REINFORCED SEAMS FOR SUITS MADE OF EXPANDED ELASTOMERS, SUCH AS DIVING SUITS
Jack W. Way, Garden Grove, Calif., assignor to W. J. Voit Rubber Corp., a corporation of California
Filed Dec. 3, 1963, Ser. No. 327,764
9 Claims. (Cl. 161—36)

This invention relates to expanded elastomer suits such as diving suits, suits for water skiing and suits worn by military personnel who are engaged in flying over water; more particularly, the invention relates to suitable means for reinforcing cemented seams of such suits so as to prevent their failure at the seams.

Suits of the above type, whenever they are diving suits designed for use in cold water, are usually made of closed cell, expanded elastomers, such as neoprene. Sheets from $3/16''$ to $1/4''$ thick are used for cutting out the panels and bonding the cut-out panels to each other by first applying suitable cement to the edges of the panel and then butt-joining these edges together after the cement had time to dry and become sufficiently tacky.

When suits are made solely from the closed cell elastomeric sheets having no "lining," such as "nylon" jersey lining, attached to one or both surfaces of the sheets, then the cemented butt joint is generally stronger than the sheet material itself, with the result that when the material is stretched in the area of a seam, the stresses are reasonably well distributed throughout the area and the ultimate failure generally occurs at the weakest point in the sheet but not at the butt joint.

Presently suits of the above type are generally made of sheets using "nylon" jersey lining permanently bonded with a rubber cement to one face of the sheet for the dual purpose of increasing the tear resistance of the sheet and for providing low coefficient of friction to facilitate putting-on and taking-off the suits.

In the suits of the above type, it is still possible to produce a butt joint between the two edges of two expanded rubber panels which is stronger than the expanded rubber panels per se, but the butt joint between the two edges of the jersey lining is quite ineffective. The lining is very thin jersey material and whatever edge-to-edge butt joint is produced at the time of butt-joining the edges of the sheets, such butt joint between the lining edges, when subjected to stress, splits quite readily. Once such separation of the lining takes place, from then on the entire stress must be resisted solely by the remaining butt joint between the two neoprene panels, without any assistance of the lining at such joint. Such concentration of the stress on the neoprene seam alone produces failure of the elastomeric sheet immediately in the vicinity of the butt joint, the butt joint still being stronger than the neoprene sheet. Thus, the nylon lining does not contribute any tensile strength at such joint because of one's inability to interconnect the two edges of the jersey lining. Therefore, once the jersey lining seam separates, the only strength that remains is the tensile strength of the neoprene sheet itself, and not the combined srength of the "nylon" jersey lining and the elastomeric sheet, and such sheet invariably fails along a line adjacent to the butt joint.

Many diving suit fabricators apply a hand-glued tape made of cloth or thin rubber or thin sponge rubber over the butt joint so as to reinforce such butt joint, and especially to join the two nylon linings to each other more effectively. The tape reinforcing method is quite expensive and it is cumbersome since it is difficult to apply tape to compoundly curved surfaces of the suits.

It is also known to sew together the seam by providing a zig-zag thread stitch for reinforcing the joint. The sewing reinforcement weakens the elastomeric sheet by punching a large number of holes in the sheet and it also creates a leakage path into the suit.

Techniques are also known of sewing together only the linings by means of rug edging sewing machines which produces a seam devoid of the desired elasticity and, in the long run, are quite ineffective from the point of view of tensile strength.

According to the invention, a proper amount of semi-liquid, or high viscosity, elastomer is poured, or extruded, over the butt joint, preferably on the lining side of the splice, and this semi-liquid elastomer, which cures itself at room temperature, then forms an elastomeric ribbon effectively joining the two edges of the lining, and it also forms chemical and mechanical bond with the lining. Therefore, the bond between the elastomeric ribbon and the panels is a very positive chemical as well as mechanical bond. The properties of such reinforcing elastomeric ribbon are adjusted so as to produce a reinforced seam having the desired degree of elasticity and stretch without, at the same time, producing any failure of the seams. The seams thus do not act as highly localized suit binding inelastic cords which cut into the flesh of the wearer because of lack of elasticity, which is usually the case with the seams of the prior art when they are reinforced with some inelastic medium.

It is, therefore, an object of this invention to provide a method and means for producing reinforced seams on elastomeric suits made from closed cell elastomeric sheets having a jersey lining cemented to one or both sides of such sheets, the seam reinforcement being obtained by extruding high viscosity liquid elastomeric compositions which cure themselves into solid, elastic seam-reinforcing ribbons forming positive chemical and mechanical bond with the lining.

It is an additional object of this invention to provide a method of reinforcing the seams of the suits made from closed cell elastomeric sheets having jersey knit lining by compounding high viscosity liquid elastomeric cements curable at room temperature, extruding such cement in ribbon form directly onto the seams of the cemented panels made of elastomeric sheets, and curing thereafter the extruded ribbon at room temperature, the compositions of the extruded ribbon being such as to form chemical and mechanical bond with the jersey knit lining.

Referring to the figures.

Figure 1:
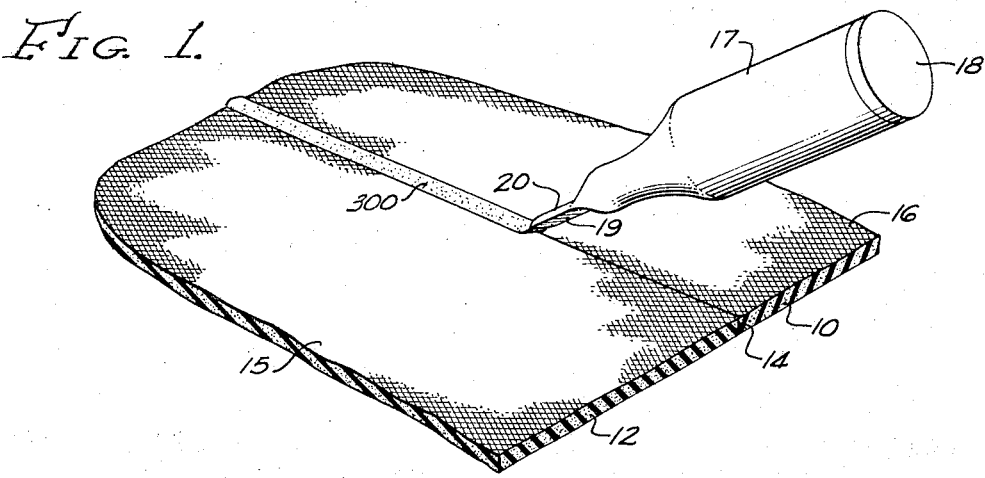
FIGURE 1 is a perspective view of one method of applying a seam reinforcing plastic to the seamed portion of the elastomeric sheet.
Figure 2:
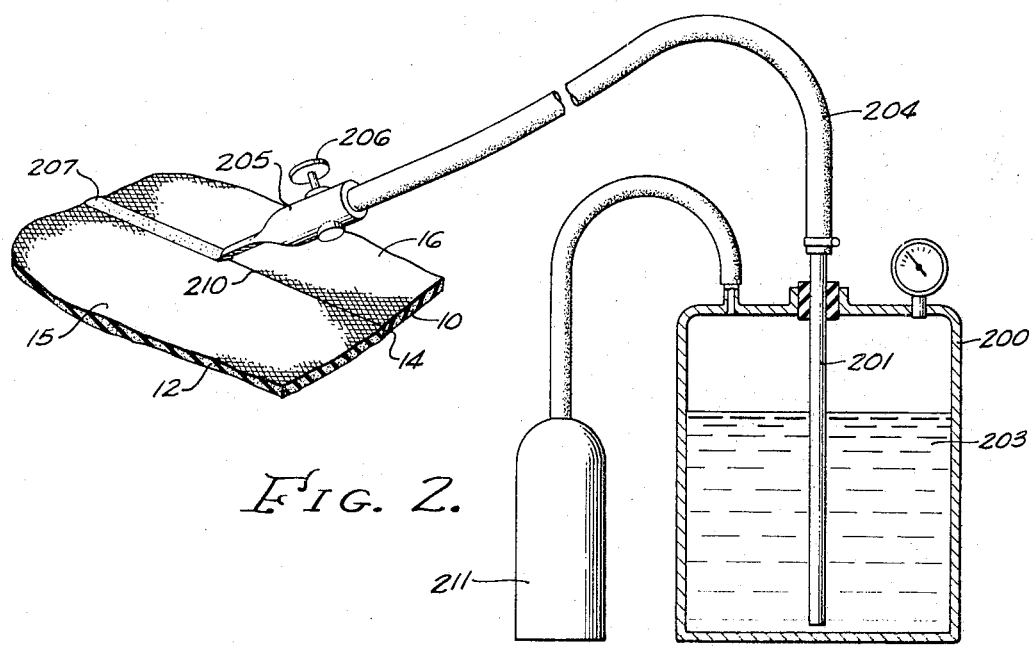
FIGURE 2 is another perspective view of an apparatus for applying seam reinforcing plastic to the seamed portion of the elastomeric sheet.
Figure 3:
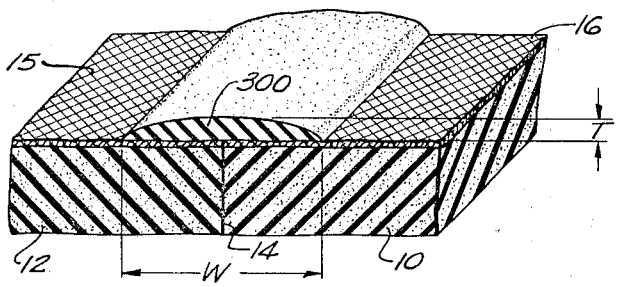
FIGURE 3 is a transverse sectional view of one end end of the seam reinforcing ribbon and an asymmetric view of a portion of its length.

Referring a FIGURES 1 and 2, seamed portions of the neoprene rubber panels 10 and 12 are cemented together with a rubber cement to form a seam 14. The top surfaces of the neoprene sheets 10 and 12 have jersey linings 15 and 16 cemented to these surfaces by means of a rubber cement. The lining, preferably, is made of a synthetic fiber, such as "nylon." A flexible squeezeable applicator 17 is filled, through a detachable end 18, with a high viscosity liquid seam reinforcing elastomer. The applicator 17 is provided with a semi-elliptical opening having straight lower edge 19, a slightly curved semi-elliptical upper edge 20 so as to squeeze a ribbon of the elastomer having a semi-elliptical cross-section illustrated at 300 in FIG. 3. The preferred width W of the squeezed ribbon is about $1/4''$ wide and the maximum thickness T is from .010" to .015" thick after the elastomer has undergone drying and curing at room temperature.

A different apparatus, achieving the same results, is illustrated in FIG. 2. A pressure container 200 is maintained under pressure by being connected to a source 211 of compressed air, and is provided with a tube 201 which extends through container 200 and stops just above its bottom. The container is filled with a high viscosity liquid elastomer 203. A pressure hose 204 is connected to rod 201 and on the end of hose 204 there is provided a nozzle 205 having a valve 206. Upon depressing valve 206, an elastomeric ribbon 207 is extruded through nozzle 205 and it is applied directly to the seam portion 210 in the manner illustrated at FIG. 2.

Since the liquid elastomers used for producing the seam reinforcing ribbon are self-curing, the only step that remains after a ribbon 207 is applied to the seams is allowing it to cure itself at ambient temperature and atmosphere, which is accomplished by leaving the newly reinforced seam at room temperature for the required length of time. The loss of water, when water is used, takes place from approximately one to four hours; the loss of solvent or solvents takes place in 30 minutes to one hour, and curing requires several days to reach an optimum cure.

The formulations suitable for making the seam reinforcing ribbon are discussed below.

Example 1

[All parts are by dry weight]

| | |
|---|---|
| Natural rubber (from latex dispersion) | 100. |
| Sodium alkyl sulfates (Aquarex D) | 0.1 |
| Sulfur | 1.0 |
| Activated dithiocarbamate (Set Sit #5) | 0.5 |
| 2,2'-methylenebis (antioxidant #2246) (4-ethyl-6-tertiary butyl phenol) | 1.0 |
| Zinc oxide | 0.05 |
| Sodium polyacrylate | 3.75 |
| | 106.30 |

In this example, which is an aqueous dispersion of natural rubber and other chemicals, the various ingredients are pre-dispersed in water having a pH reading from about 8 to 11. Such dispersion produces rubber latex having high solids content.

The rubber latex is obtained by centrifuging a natural rubber latex to a concentration of about 70% solids. This produces a thick, creamy aqueous dispersion of natural rubber which also provides desirable characteristics for this reinforcing self-curing ribbon. In the preferred form, the aqueous dispersion should contain the usual curing ingredients such as sulphur, zinc oxide and an organic accelerator. This dispersion produces a viscosity of from 35,000 to 50,000 centipoises.

The sodium alkyl sulfates are used as a wetting or dispersing agent. Sulfur is the vulcanizing agent, dithiocarbamate is an accelerator providing cure at room temperature; 2,2'-methylene bis is an antioxidant which enhances the cured product to withstand normal weathering and radiation; zinc oxide is an activator in the sulfur-rubber vulcanizing process.

Normally, the above ingredients are blended prior to the addition of sodium polyacrylate, a thickener for latex available as a 12% to 13% solution in water. This is added as a final step in the mixing process and thus increases the viscosity of the material to the previously mentioned acceptable viscosity of from 35,000 to 50,000 centipoises.

Cured ribbon physical properties:

| | |
|---|---|
| Tensile, p.s.i. | 1000 |
| Elongation, percent | 1000 |

Example 2

[All parts are by dry weight]

Part A:

| | |
|---|---|
| Chloroprene rubber (such as Du Pont's Neoprene AC) | 100 |
| Extra light calcined magnesium oxide | 4 |
| Hydrated, precipitated calcium silicate (reinforcing filler) | 30 |
| Stearic acid (dispersing agent for calcium silicate) | 1 |
| Zinc oxide (vulcanizer) | 5 |
| Sulfur (vulcanizer) | 1 |
| | 141 |

Part B:

| | |
|---|---|
| Part A | 141 |
| Toluene (Solvents for Part A) | 112 |
| Hexane | 112 |
| | 365 |

Part C:

| | |
|---|---|
| Part B | 365 |
| Methylene bis (4-phenylisocyanate) (accelerator-curative and bonding agent) from Du Pont's Hylene M-50 | 5 |
| | 370 |

The second type of composition consists of a chloroprene synthetic rubber, also known as neoprene, which is compounded with curing ingredients, such as magnesium oxide and zinc oxide, and a reinforcing filler such as a hydrated, precipitated calcium silicate. The resulting elastomeric mix, having the form of a rubber sheet, is easily put into solution by cutting this mix into relatively small pieces, and churning it in an aromatic solvent, such as a 50-50 mixture of toluene and hexane which has a comparatively fast evaporation rate. To provide an isocyanate cross-linking agent, 5% of methylene bis (4-phenylisocyanate) is added, first, to improve the chemical and mechanical bond between the elastomer of the ribbon and the lining because of its cross-linking properties, and, second, to provide room temperature curing property to this formulation.

The resulting mixture has a viscosity of from 40,000 to 60,000 centipoises.

Cured ribbon physical properties:

| | |
|---|---|
| Tensile, p.s.i. | 2000 |
| Elongation, percent | 500 |

Example 3

[All parts are by dry weight]

| | |
|---|---|
| Liquid urethane rubber (as DuPont's Adiprene L-100) | 100. |
| Wood flour | 13. |
| N-Amino ethyl piperazine | .05 |
| Water | 9.95 |
| | 123.00 |

The third formulation uses an inherently liquid urethane rubber, which is the product of reaction between diisocyanate and a polyalkylene ether glycol. Since this material has a viscosity of about 15,000 centipoises, the material would not form the desired seam reinforcing ribbon, but rather, would flow into a thin coating on the knit jersey lining. By adding 13% wood flour, the viscosity is increased to about 90,000 to 120,000 centipoises and thus the ribbon is made to hold its shape.

In Example 3, polyamine is first combined with the wood flour and this mixture is then added to the liquid urethane rubber just prior to use. The resulting mixture has the desired viscosity and will convert to the tough, rubbery ribbon over a period of about 18-24 hours at room temperature.

Cured ribbon physical properties:

Tensile, p.s.i. ---------------------------------- 600
Elongation, percent ------------------------------ 200

In measuring the viscosities of the above compositions, the following method of measuring was used:

Brookfield Viscometer—Model LVF
Spindle—#4
R.p.m.—#6
Room temp.—75°

The formulations given above produce an elastomeric material having the following physical properties:

Tensile strength—Between 600 and 2000 p.s.i.
Percent of elongation—Between 200 and 1000.

What is claimed is:

1. A reinforced seam for a diving suit having adjacent panels of an elastomeric expanded sheet including a jersey lining bonded on at least one side of said sheets, said seam comprising:
   a cemented butt joint between adjacent edges of the expanded sheet, and
   an extruded elastomeric ribbon having a predetermined strength and elasticity superimposed directly over said seam on a lining side of the sheet, said elastomeric ribbon forming a direct bond with said lining and permeating said lining to join the adjacent linings and thereby prevent seam failures.

2. The seam as defined in claim 1 in which said bond comprises a chemical and mechanical bond between said ribbon and said lining.

3. The seam as defined in claim 1 in which said elastomeric ribbon has a tensile strength between 600 and 2000 pounds per square inch and percent of elongation between 200% and 1000%.

4. The seam as defined in claim 1 in which said chemical bond is the bond between the lining fiber and a free isocyanate radical furnished by an accelerator-curative bonding agent present in the formulation of said ribbon.

5. The seam as defined in claim 1 in which said elastomeric ribbon includes any one of the following class of materials: natural rubber, urethane rubber, chloroprene rubber, each of said rubbers having means to make said rubbers curable at room temperature.

6. The method of making a reinforced seam between two closed cell expanded elastomeric sheet members having a jersey lining cemented to at least one side of said members comprising the steps of:
   cementing together with an elastomeric cement two abutting edges of said members;
   extruding on top of one of the jersey linings and along the abutting edges of the sheet a ribbon of an elastomeric mixture having a viscosity between 35,000 and 120,000 centipoises; and,
   curing said ribbon at room temperature for a predetermined time interval.

7. The method as defined in claim 6 in which said elastomeric mixture is a high solid-content aqueous dispersion of natural rubber having a viscosity of from 35,000 to 50,000 centipoises and also having an accelerator to produce a cure of said dispersion at room temperature.

8. The method as defined in claim 6 in which said elastomeric mixture is a solution comprising chloroprene rubber having a viscosity from 40,000 to 60,000 centipoises and having an accelerator-curative-bonding agent to produce a chemical and mechanical bond between said ribbon and said lining.

9. The method as defined in claim 6 in which said elastomeric mixture is a liquid urethane rubber and a thickener, said mixture having a viscosity from 90,000 to 120,000 centipoises.

References Cited by the Examiner

UNITED STATES PATENTS

| 2,960,425 | 11/1960 | Sherman | 156—304 |
| 2,981,954 | 5/1961 | Garbellano | 2—2.1 |

FOREIGN PATENTS 1,306,301  9/1962  France.

EARL M. BERGERT, *Primary Examiner.*

D. J. DRUMMOND, *Examiner.*